(12) United States Patent
Reetz et al.

(10) Patent No.: US 12,454,119 B2
(45) Date of Patent: Oct. 28, 2025

(54) ARTICLE FOR USE WITH GLASS SURFACE

(71) Applicant: 3M INNOVATIVE PROPERTIES COMPANY, St. Paul, MN (US)

(72) Inventors: Max J. Reetz, Bloomington, MN (US); Bradley J. Schlader, St. Louis, MO (US); Gregory F. King, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 362 days.

(21) Appl. No.: 18/271,517

(22) PCT Filed: Jan. 10, 2022

(86) PCT No.: PCT/IB2022/050140
§ 371 (c)(1),
(2) Date: Jul. 10, 2023

(87) PCT Pub. No.: WO2022/153158
PCT Pub. Date: Jul. 21, 2022

(65) Prior Publication Data
US 2024/0075712 A1 Mar. 7, 2024

Related U.S. Application Data

(60) Provisional application No. 63/136,717, filed on Jan. 13, 2021.

(51) Int. Cl.
*B32B 15/08* (2006.01)
*B32B 7/12* (2006.01)
(Continued)

(52) U.S. Cl.
CPC ............ *B32B 15/08* (2013.01); *B32B 7/12* (2013.01); *B32B 15/043* (2013.01); *C03C 27/10* (2013.01)

(58) Field of Classification Search
None
See application file for complete search history.

(56) References Cited

U.S. PATENT DOCUMENTS

| 3,290,203 A | 12/1966 | Antonson et al. |
| 4,751,087 A | 6/1988 | Wick |

(Continued)

FOREIGN PATENT DOCUMENTS

| EP | 2855144 B1 | 6/2017 |
| EP | 3179282 A1 | 6/2017 |

(Continued)

OTHER PUBLICATIONS

International Search report for PCT International Application No. PCT/IB2022/050140, mailed on Apr. 12, 2022, 4 pages.

*Primary Examiner* — John Vincent Lawler
(74) *Attorney, Agent, or Firm* — Vincent Pham (57) ABSTRACT

An article including a multilayer stack and an adhesive layer is provided. The multilayer stack includes a substrate layer, a first layer, a second layer, a third layer and a fourth layer. The first layer is disposed adjacent to the substrate layer. The first layer includes nichrome. The second layer is disposed adjacent to the first layer opposite to the substrate layer. The second layer includes aluminum. The third layer is disposed adjacent to the second layer opposite to the first layer. The third layer includes a first metal oxide. The fourth layer is disposed adjacent to the third layer opposite to the second layer. The fourth layer includes a second metal oxide different from the first metal oxide. The adhesive layer is disposed adjacent to the fourth layer opposite to the third layer. The adhesive layer includes an adhesive for attaching the multilayer stack to a glass surface.

20 Claims, 7 Drawing Sheets

(51) Int. Cl.
*B32B 15/04* (2006.01)
*C03C 27/10* (2006.01)

(56) References Cited

U.S. PATENT DOCUMENTS

| | | | |
|---|---|---|---|
| 5,563,734 A * | 10/1996 | Wolfe | G02B 5/282 |
| | | | 204/192.27 |
| 7,232,615 B2 | 6/2007 | Buhay et al. | |
| 9,059,425 B2 | 6/2015 | Thoumazet et al. | |
| 9,102,565 B2 | 8/2015 | Durandeau et al. | |
| 9,556,068 B2 | 1/2017 | Buhay et al. | |
| 9,845,262 B2 | 12/2017 | Brossard | |
| 10,025,010 B2 | 7/2018 | Hevesi et al. | |
| 10,207,952 B2 | 2/2019 | Brossard | |
| 2006/0057399 A1 | 3/2006 | Persoone et al. | |
| 2006/0257670 A1 * | 11/2006 | Brochot | C03C 17/36 |
| | | | 428/432 |
| 2009/0136765 A1 | 5/2009 | Maschwitz et al. | |
| 2009/0169879 A1 | 7/2009 | Padiyath | |
| 2012/0052320 A1 * | 3/2012 | Van Nutt | B32B 7/12 |
| | | | 427/457 |
| 2013/0288039 A1 | 10/2013 | Chang et al. | |
| 2013/0330570 A1 * | 12/2013 | Michiels | B32B 7/12 |
| | | | 428/433 |
| 2014/0242333 A1 | 8/2014 | Oono et al. | |
| 2014/0352685 A1 * | 12/2014 | Gee | B32B 15/20 |
| | | | 126/714 |
| 2015/0146287 A1 | 5/2015 | Kuhlmann et al. | |
| 2017/0204000 A1 | 7/2017 | Varanasi | |
| 2017/0227694 A1 * | 8/2017 | Nakanishi | G02B 5/208 |
| 2018/0355467 A1 | 12/2018 | Lee et al. | |
| 2019/0055157 A1 | 2/2019 | Hagen et al. | |
| 2019/0330101 A1 | 10/2019 | Cid et al. | |
| 2019/0344642 A1 | 11/2019 | Meyer et al. | |
| 2020/0017404 A1 | 1/2020 | Guimard et al. | |
| 2020/0165163 A1 | 5/2020 | Mizutani et al. | |

FOREIGN PATENT DOCUMENTS

| | | |
|---|---|---|
| EP | 3609967 B1 | 6/2022 |
| WO | 2019004199 A1 | 1/2019 |
| WO | 2020183384 A1 | 9/2020 |

* cited by examiner

ARTICLE FOR USE WITH GLASS SURFACE

The present disclosure relates to a transparent film with a corrosion-resistant metal layer for use with a glass surface.

A conventional window film typically includes a metal layer, and an adhesive on one side of the metal layer. The adhesive is used for attaching the window film to a window. A combination of the window film and the window may act like a one-way glass and may provide privacy to occupants inside a building. However, the metal layer in the conventional window film may be vulnerable to one or more of oxidation and corrosion.

SUMMARY

A first aspect of the present disclosure relates to an article for use with a glass surface. The article includes a multilayer stack and an adhesive layer. The multilayer stack includes a substrate layer, a first layer, a second layer, a third layer, and a fourth layer. The first layer is disposed adjacent to the substrate layer. The first layer includes nichrome. The second layer is disposed adjacent to the first layer opposite to the substrate layer. The second layer includes aluminum. The third layer is disposed adjacent to the second layer opposite to the first layer. The third layer includes a first metal oxide. The fourth layer is disposed adjacent to the third layer opposite to the second layer. The fourth layer includes a second metal oxide different from the first metal oxide. The adhesive layer is disposed adjacent to the fourth layer opposite to the third layer. The adhesive layer includes an adhesive for attaching the multilayer stack to the glass surface.

A second aspect of the present disclosure relates to an article for use with a glass surface. The article includes a multilayer stack and an adhesive layer. The multilayer stack includes a substrate layer, a first layer, a second layer, a third layer, a fourth layer, and a protective layer. The first layer is disposed adjacent to the substrate layer. The first layer includes nichrome. The second layer is disposed adjacent to the first layer opposite to the substrate layer. The second layer includes aluminum. The third layer is disposed adjacent to the second layer opposite to the first layer. The third layer includes silicon oxide. The fourth layer is disposed adjacent to the third layer opposite to the second layer. The fourth layer includes zinc tin oxide. The protective layer is disposed adjacent to the substrate layer opposite to the first layer. The protective layer includes a light absorbing material. The adhesive layer is disposed adjacent to the fourth layer opposite to the third layer. The adhesive layer includes an adhesive for attaching the multilayer stack to the glass surface. The multilayer stack has a water vapor transmission rate of at least about 1.0 gram per square meter per day at 50° C. The multilayer stack further has a visible light transmittance from about 5% to about 35%. The multilayer stack has, for a light incident at the fourth layer, a visible light reflectivity from about 10% to about 40%. The multilayer stack further has, for the light incident at the protective layer, a visible light reflectivity from about 6% to about 10%.

A third aspect of the present disclosure relates to an article for use with a glass surface. The article includes a multilayer stack and an adhesive layer. The multilayer stack includes a substrate layer, a first layer, a second layer, a third layer, and fourth layer. The first layer is disposed adjacent to the substrate layer. The first layer includes nichrome. The second layer is disposed adjacent to the first layer opposite to the substrate layer. The second layer includes aluminum. The third layer is disposed adjacent to the second layer opposite to the first layer. The third layer includes silicon oxide. The fourth layer is disposed adjacent to the third layer opposite to the second layer. The fourth layer includes zinc tin oxide. The adhesive layer is disposed adjacent to the fourth layer opposite to the third layer of the multilayer stack. The adhesive layer includes an adhesive for attaching the multilayer stack to the glass surface. The multilayer stack has a water vapor transmission rate of at least about 1.0 gram per square meter per day at 50° C. The multilayer stack further has a visible light transmittance of at least 5%. The multilayer stack has, for light incident at each of the fourth layer and the substrate layer, a visible light reflectivity from about 10% to about 40%.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

As recited herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent or directly adjacent.

By using words of orientation such as "on", "uppermost" it is referred to the relative position of one or more particle with respect to a horizontal support layer.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers. A layer typically includes two opposing major surfaces.

As used herein, the term "visible light transmittance" (VLT) refers to a ratio of total visible light that is transmitted through a film to total visible light incident on the film. The VLT may be measured using a BYK haze-gard i Transmission Meter.

As used herein, the term "visible light reflectivity" (VLR) refers to a ratio of total visible light that is reflected by a film to total visible light incident on the film. The VLR may be calculated by averaging wavelength-specific reflectivity across a visible spectrum (i.e. from about 400 nm to about 700 nm). Wavelength-specific, or spectral, reflectivity can be measured using a HunterLab UltraScan PRO spectrophotometer in a reflectance with specular reflection included (or RSIN) mode. A change in reflectivity (Rc) is calculated by subtracting an initial VLR (VLRi) from a final VLR (VLRf) measured at the end of a test, and dividing the difference between the final VLR (VLRf) and the initial VLR (VLRi) by the initial reflectivity (VLRi).

$$Rc=(VLRf-VLRi)/VLRi$$

As used herein, the term "water vapor transmission rate" (WVTR) refers to a rate of water vapor transmission through a film. The WVTR may be measured using a MOCON PERMATRAN-W® 700 WVTR Analyzer operated at a temperature of about 50° C. and relative humidity (RH) of about 100%, about 95%, or about 90%. The WVTR may be expressed in grams per square meter per day ($g/m^2/day$).

As used herein, the term "adhesive" generally refers to polymeric compositions useful to adhere together two adherends. Adhesives can be activatable by pressure, heat, or combinations thereof. Suitable adhesives may include those based on acrylates, rubber resin, urethanes, or combinations thereof.

As used herein, the term "optically clear adhesive" refers to an adhesive that exhibits an optical transmission of at least about 80%, as measured on a sample having a thickness from about 5 microns (lam) to about 250 µm. In some embodiments, the optical transmission may be at least about 85%, 90%, 95% or higher.

As used herein, the term "optically clear" refers to an absence of visibly noticeable distortion, haze or flaws as detected by the naked eye at about 1-meter distance.

As used herein, the term "oxidation" refers to a chemical process during which there is a gradual and uniform conversion of a metal to a metal oxide in the presence of oxygen.

As used herein, the term "corrosion" refers to a chemical process during which there is a rapid and uneven discoloration of a metal when it is attacked by corrosive agents, such as water.

As used herein, the term "peel strength" is defined as the average load per unit width of bond line required to separate two bonded materials, measured at a specific angle and rate. Peel force may be measured by applying samples to a clean glass and allowing to condition in a constant temperature and humidity (CTH) environment (50% RH/70° F.) for at least about 48 hours. The peel strength may then be measured using an IMASS SP-2000 peel tester in a 180° peel configuration at a speed of 90 inches per minute (in/min) at a setting of 5-second data averaging.

As used herein, the term "optical density" of an element refers to a value A calculated according to the following equation:

$$A=-\log(VLT)$$

where VLT represents visible light transmittance. Optical density is a measure of optical absorbance of the element.

The present disclosure relates to an article for use with a glass surface. The article includes a multilayer stack and an adhesive layer. The multilayer stack includes a first layer. The first layer is disposed adjacent to the substrate layer. The first layer includes nichrome. The multilayer stack includes a second layer adjacent to the first layer and opposite to the substrate layer. The second layer includes aluminum. The multilayer stack includes a third layer disposed adjacent to the second layer and opposite to the first layer. The third layer includes a first metal oxide. The multilayer stack further includes a fourth layer disposed adjacent to the third layer and opposite to the second layer. The fourth layer includes a second metal oxide different from the first metal oxide. The adhesive layer is disposed adjacent to the fourth layer opposite to the third layer. The adhesive layer includes an adhesive for attaching the multilayer stack to the glass surface.

A conventional window film generally includes a metal layer. Further, a water-based solution is typically applied to a window glass during the installation of the window film. Further, an adhesive is used for attaching the window film to the window glass. The adhesive may include a corrosive agent. The metal layer may undergo corrosion due to one or more of the water-based solution and the corrosive agent in the adhesive. In some cases, the metal layer may undergo corrosion due to environmental factors. The corrosion may further result in non-uniform increase in transmission of light across a width the window film.

Some conventional metallized window films can protect the metal layer from corrosion with polymer barrier layers. These polymer barrier layers must either be applied by lamination of a polymer film or coating of a polymer solution over the metal film. In both cases, the addition of the polymer barrier layers requires an additional manufacturing step which significantly increases manufacturing cost.

Some conventional corrosion-resistant metallized films use vacuum deposited oxide layers on both sides of the metal layer or acrylate smoothing layers underneath the metal layer to improve corrosion resistance. However, such corrosion-resistant metallized films with oxide layers may have a substantially low water vapor transmission rate (WVTR) and are, therefore, not often used for window film applications. While a low WVTR may provide better corrosion resistance, it will also increase a drying time of the window film on the window glass. In that case, the water-based solution applied to the window glass during the installation of the window film may further create a visibly hazy appearance that may take days or weeks to clear up. Specifically, residual water from the water-based solution applied to the window glass may cause the visibly hazy appearance that may take days or weeks to clear up. Therefore, the window film may require a minimum permeability to moisture in order to allow any residual water to dry out in a reasonable amount of time. Therefore, the drying time of the conventional corrosion-resistant metallized films with oxide layers may be unacceptably long for window film applications.

The third layer and the fourth layer of the article including the first and second metal oxides may protect the second layer from corrosion.

In cases where there are no protective oxide layers over the metal, the likelihood of oxidation of the metal layer may lead to a short shelf life prior to coating and thereby presents scheduling issues for a manufacturing site and may also lead to a loss of the window film beyond the shelf life of the window film.

The third layer and the fourth layer of the article including the first and second metal oxides may further protect the second layer from oxidation. Specifically, the third layer and the fourth layer may protect the second layer including aluminum from exposure to air. Therefore, the article may be protected against oxidation and may have an improved shelf life.

Further, the third layer and the fourth layer, disposed on a same side of the second layer including aluminum, may allow water transmission from the multilayer stack while providing protection against both corrosion and oxidation. Therefore, the third layer and the fourth layer disposed on the same side of the second layer may provide permeability to moisture and may allow any residual water to dry out in a reasonable amount of time. When properly selected, the third and fourth layers may provide a higher WVTR than other barrier coatings. The higher WVTR may provide an increased drying rate and may allow any residual water to dry out in a lesser amount of time.

Furthermore, when the conventional window film is removed from the window for repair or replacement purposes, the expectation is that the adhesive is not left behind. However, many barrier materials demonstrate poor bond to the adhesive, which may result in the adhesive being left behind when a window film including barrier materials is removed.

The third layer and the fourth layer including the first and second metal oxides, respectively, may further provide a strong adhesion to the adhesive layer disposed on the fourth layer. The strong adhesion between the adhesive layer and the fourth layer may cause the adhesive layer to bond more strongly to the fourth layer than to the glass surface of the window. Specifically, the strong adhesion between the adhesive layer and the fourth layer may cause the adhesive layer to bond more strongly to the multilayer stack than to the glass surface of the window. This may ensure that the adhesive layer is not left behind when the article is removed from the glass surface for repair or replacement purposes. In other words, the strong adhesion between the adhesive layer and the fourth layer may allow clean removal of the article from the glass surface.

Therefore, the article may provide a good optical performance, for example, with respect to VLT and VLR, while having a good corrosion and oxidation resistance, water vapor transmission rate and a strong interlayer adhesion which may be required for a satisfactory installation and removal of the article on the window.

These concepts are better understood in view of the embodiments described below that illustrate and do not limit the scope of the present disclosure.

Figure 1:
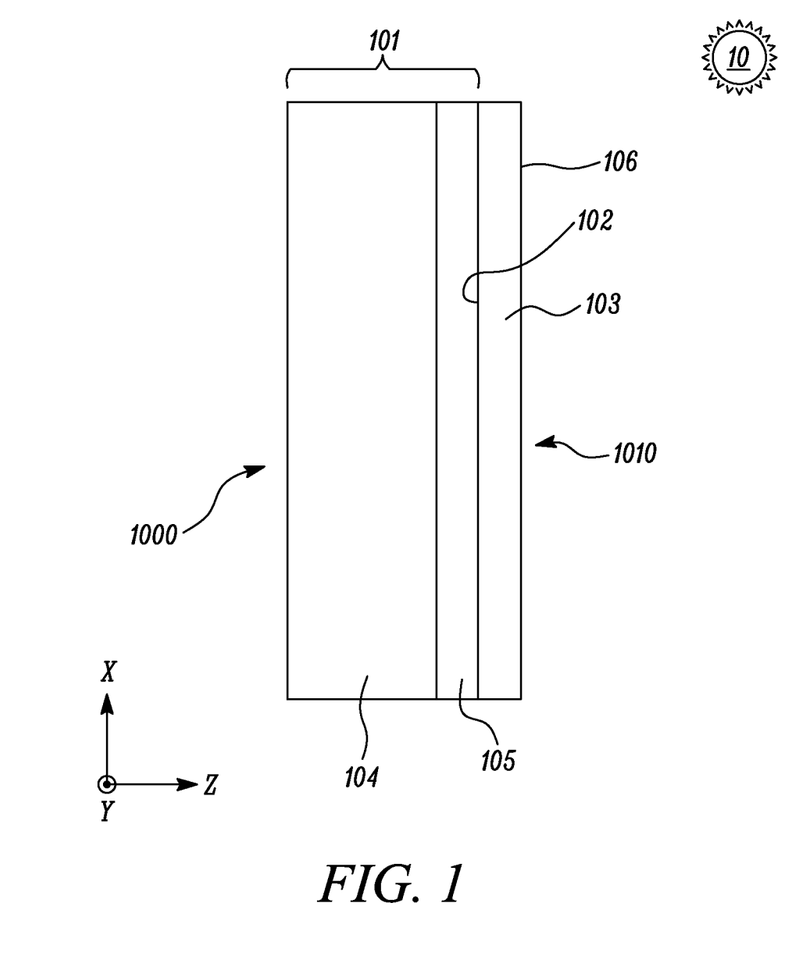
FIG. 1 illustrates a schematic cross-sectional view of an article, according to an embodiment of the present disclosure.

FIG. 1 illustrates a schematic cross-sectional view of an article 101, according to an embodiment of the present disclosure. In the illustrated embodiment of FIG. 1, the article 101 is disposed on a window 103. However, in some other embodiments, the article 101 may be used in applications, such as, but not limited to, glass doors, skylights, and so forth, of a building or a vehicle. The window 103 includes a first glass surface 102 and a second glass surface 106 opposite to the first glass surface 102. In some embodiments, the first glass surface 102 of the window 103 faces an interior side 1000 of a building (not shown) and the second glass surface 106 of the window 103 faces an exterior side 1010 of the building. In other words, the first glass surface 102 of the window 103 faces an enclosed environment, while the second glass surface 106 of the window 103 is exposed to an external environment. The second glass surface 106 may therefore be exposed to an external light source 10, such as sun. In some cases, the external light source 10 may be any light source disposed in the exterior side 1010. In some other embodiments, the first glass surface 102 of the window 103 may face the exterior side 1010 of the building and the second glass surface 106 of the window 103 may face the interior side 1000 of the building. In such cases, the article 101 may face the interior side 1000 of the building instead of the exterior side 1010.

The first glass surface 102 may be interchangeably referred to as the "the glass surface 102". Similarly, the second glass surface 106 may be interchangeably referred to as the "the glass surface 106".

The article 101 defines mutually orthogonal X, Y and Z-axes. The X and Y-axes are in-plane axes of the article 101, while the Z-axis is a transverse axis disposed along a thickness of the article 101. In other words, the X and Y-axes are disposed along a plane of the article 101, while the Z-axis is perpendicular to the plane of the article 101.

The article 101 includes a multilayer stack 104 and an adhesive layer 105. The multilayer stack 104 and the adhesive layer 105 of the article 101 are disposed adjacent to each other along the Z-axis.

Figure 2:
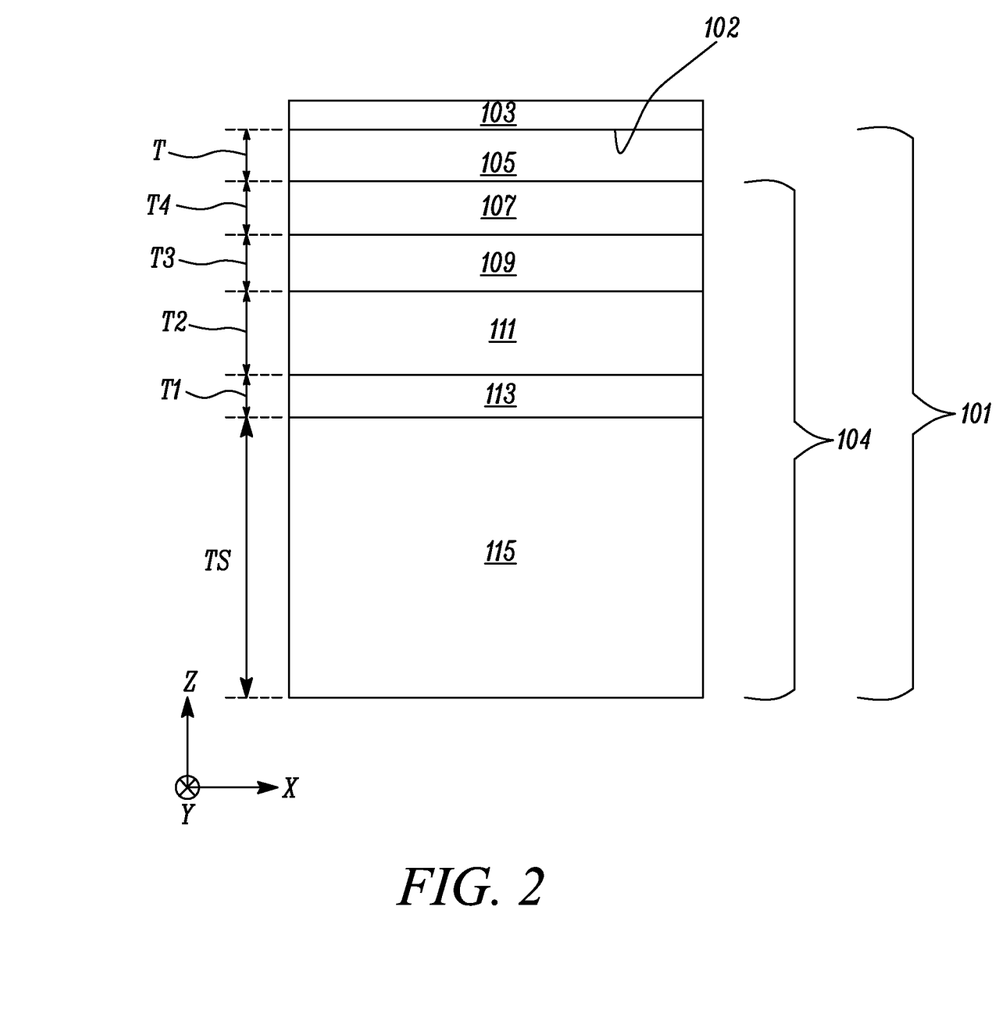
FIG. 2 illustrates a detailed schematic cross-sectional view of the article, according to an embodiment of the present disclosure.

FIG. 2 illustrates a detailed schematic cross-sectional view of the article 101 for use with the glass surface 102 of the window 103. The article 101 includes the multilayer stack 104 and the adhesive layer 105. The multilayer stack 104 includes a substrate layer 115, a first layer 113, a second layer 111, a third layer 109, and a fourth layer 107. The substrate layer 115, the first layer 113, the second layer 111, the third layer 109, and the fourth layer 107 of the multilayer stack 104 are disposed adjacent to each other along the Z-axis. In some embodiments, the first layer 113, the second layer 111, the third layer 109, and the fourth layer 107 may be deposited on the substrate layer 115 using a vacuum-deposition method. In some other embodiments, the first layer 113, the second layer 111, the third layer 109, and the fourth layer 107 may be deposited on the substrate layer 115 using a magnetron sputtering deposition method. In some other embodiments, the first layer 113, the second layer 111, the third layer 109, and the fourth layer 107 may be deposited on the substrate layer 115 using any suitable deposition method.

In some embodiments, the substrate layer 115 includes a polymeric material. In some embodiments, the substrate layer 115 includes a polymeric material having a visible light transmittance (VLT) of at least about 90%. In some embodiments, the polymeric material has the VLT of at least about 92%, at least about 94%, at least about 95%, at least about 96%, or at least about 98%. In some embodiments, the polymeric material may include a polyethylene terephthalate (PET). The PET may provide properties, such as a mechanical strength, a thermal resistance, a chemical resistance as well as a dimensional stability. In some other embodiments, the polymeric material may include one or more of a polyethylene naphthalate (PEN), a polyetheretherketone (PEEK), a polyaryletherketone (PAEK), a polyarylate (PAR), a polyetherimide (PEI), a polyarylsulfone (PAS), a polyethersulfone (PES), a polyamideimide (PAI), and a polyimide.

In some embodiments, the substrate layer 115 has a substrate thickness TS. In some embodiments, the substrate thickness TS of the substrate layer 115 is from about 20 microns to about 105 microns. In some embodiments, the substrate thickness TS of the substrate layer 115 is from about 25 microns to about 175 microns. In some embodiments, the substrate thickness TS in the substrate layer 115 is about 50.8 microns. In some other embodiments, the substrate thickness TS of the substrate layer 115 may be less than or equal to about 15 microns, less than or equal to about 20 microns, less than or equal to about 30 microns, less than or equal to about 40 microns, less than or equal to about 50 microns, less than or equal to about 60 microns, less than or equal to about 70 microns, less than or equal to about 80 microns, less than or equal to about 90 microns, less than or equal to about 100 microns, less than or equal to about 110 microns, less than or equal to about 115 microns, or less than or equal to about 120 microns. In some embodiments, the substrate thickness TS of the substrate layer 115 may be greater than or equal to about 15 microns, greater than or equal to about 20 microns, greater than or equal to about 25 microns, greater than or equal to about 30 microns, greater than or equal to about 35 microns, greater than or equal to about 40 microns, greater than or equal to about 45 microns, or greater than or equal to about 50 microns. The substrate thickness TS of the substrate layer 115 may be based on desired application attributes.

The first layer 113 is disposed adjacent to the substrate layer 115. Specifically, the first layer 113 is disposed directly adjacent to the substrate layer 115, such that at least a portion of a major surface of the first layer 113 contacts an adjacent major surface of the substrate layer 115. The first layer 113 includes nichrome (NiCr). The first layer 113 may provide a strong adhesion to the substrate layer 115.

In some embodiments, the first layer 113 has a first thickness T1. In some embodiments, the first thickness T1 of the first layer 113 is from about 0.5 nanometers to about 5 nanometers. In some embodiments, the first thickness T1 of the first layer 113 is about 2 nanometers. In some other embodiments, the first thickness T1 of the first layer 113 may be less than or equal to about 1 nanometer, less than or equal to about 2 nanometers, less than or equal to about 3 nanometers, less than or equal to about 4 nanometers, less than or equal to about 5 nanometers, less than or equal to about 6 nanometers, or less than or equal to about 7 nanometers. In some embodiments, the first thickness T1 of the first layer 113 may be greater than or equal to about 0.5 nanometers, greater than or equal to about 1 nanometer, greater than or equal to about 2 nanometers, greater than or equal to about 3 nanometers, greater than or equal to about 4 nanometers, or greater than or equal to about 5 nanometers. The first thickness T1 of the first layer 113 may be based on desired application attributes.

The second layer 111 is disposed adjacent to the first layer 113 opposite to the substrate layer 115. Specifically, the second layer 111 is disposed directly adjacent to the first layer 113, such that at least a portion of a major surface of the second layer 111 contacts an adjacent major surface of the first layer 113. The second layer 111 includes aluminum. The second layer 111 may provide desired optical properties. For example, the second layer 111 may act as a metallic reflective layer. In some embodiments, the second layer 111 has an optical density from about 0.1 to 1.3. In some embodiments, the second layer 111 has the optical density less than or equal to about 0.1, less than or equal to about 0.25, less than or equal to about 0.5, less than or equal to about 0.75, less than or equal to about 1, less than or equal to about 1.25, or less than or equal to about 1.5. In some embodiments, the second layer 111 has a VLT from about 5% to about 80%. In some embodiments, the second layer 111 has the VLT greater than or equal to about 2%, greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 75%, greater than or equal to about 80%, greater than or equal to about 85%, or greater than or equal to about 90%. Aluminum may be inexpensive and may provide desired optical properties, for example, a desired value of the VLT.

In some embodiments, the second layer 111 has a second thickness T2. In some embodiments, the second thickness T2 of the second layer 111 is from about 2 nanometers to about 25 nanometers. In some embodiments, the second thickness T2 of the second layer 111 may be about 17 nanometers. In some other embodiments, the second thickness T2 of the second layer 111 may be less than or equal to about 2 nanometers, less than or equal to about 5 nanometers, less than or equal to about 10 nanometers, less than or equal to about 12 nanometers, less than or equal to about 15 nanometers, less than or equal to about 18 nanometers, less than or equal to about 20 nanometers, less than or equal to about 25 nanometers, or less than or equal to about 30 nanometers. In some embodiments, the second thickness T2 of the second layer 111 may be greater than or equal to 1 nanometers, greater than or equal to about 2 nanometers, greater than or equal to about 5 nanometers, greater than or equal to about 7 nanometers, greater than or equal to about 10 nanometers, greater than or equal to about 12 nanometers, greater than or equal to about 15 nanometers, greater than or equal to about 20 nanometers, or greater than or equal to about 25 nanometers. The second thickness T2 of the second layer 111 may be selected based on desired attributes, such as a desired optical density or desired optical density range.

The third layer 109 is disposed adjacent to the second layer 111 opposite to the first layer 113. Specifically, the third layer 109 is disposed directly adjacent to the second layer 111, such that at least a portion of a major surface of the third layer 109 contacts an adjacent major surface of the second layer 111. The third layer 109 includes a first metal oxide. In some embodiments, the first metal oxide includes silicon oxide (SiOx). In some embodiments, the first metal oxide includes zinc tin oxide (ZTO). In some other embodiments, the first metal oxide may include aluminum oxide, titanium oxide, zirconium oxide, silicon-based composite metal oxide, titanium-based composite metal oxide, zirconium-based composite metal oxide, and combinations thereof.

In some embodiments, the third layer 109 has a third thickness T3. In some embodiments, the third thickness T3 of the third layer 109 is from about 1 nanometer to about 10 nanometers. In some embodiments, the third thickness T3 of the third layer 109 is about 4 nanometers. In some other embodiments, the third thickness T3 of the third layer 109 may be less than or equal to about 1 nanometer, less than or equal to about 2 nanometers, less than or equal to about 4 nanometers, less than or equal to about 6 nanometers, less than or equal to about 8 nanometers, less than or equal to about 10 nanometers, or less than or equal to about 12 nanometers. In some embodiments, the third thickness T3 of the third layer 109 may be greater than or equal to about 1 nanometer, greater than or equal to about 2 nanometers, greater than or equal to about 3 nanometers, greater than or equal to about 4 nanometers, or greater than or equal to about 5 nanometers. The third thickness T3 of the third layer 109 may be based on desired application attributes.

The fourth layer 107 is disposed adjacent to the third layer 109 opposite to the second layer 111. Specifically, the fourth layer 107 is disposed directly adjacent to the third layer 109, such that at least a portion of a major surface of the fourth layer 107 contacts an adjacent major surface of the third layer 109. The fourth layer 107 includes a second metal oxide different from the first metal oxide. In some embodiments, the second metal oxide includes ZTO. In some embodiments, the second metal oxide includes SiOx. In some other embodiments, the second metal oxide may include aluminum oxide, titanium oxide, zirconium oxide, silicon-based composite metal oxide, titanium-based composite metal oxide, zirconium-based composite metal oxide, and combinations thereof.

In some embodiments, the fourth layer 107 has a fourth thickness T4. In some embodiments, the fourth thickness T4 of the fourth layer 107 is from about 1 nanometer to about 10 nanometers. In some embodiments, the fourth thickness T4 of the fourth layer 107 is about 3 nanometers. In some other embodiments, the fourth thickness T4 of the fourth layer 107 may be less than or equal to about 1 nanometers, less than or equal to about 2 nanometers, less than or equal to about 4 nanometers, less than or equal to about 6 nanometers, less than or equal to about 8 nanometers, less than or equal to about 10 nanometers, or less than or equal to about 12 nanometers. In some embodiments, the fourth thickness T4 of the fourth layer 107 may be greater than or equal to about 1 nanometer, greater than or equal to about 2 nanometers, greater than or equal to about 3 nanometers, greater than or equal to about 4 nanometers, or greater than or equal to about 5 nanometers. The fourth thickness T4 of the fourth layer 107 may be based on desired application attributes.

In some embodiments, a ratio of the third thickness T3 of the third layer 109 to the fourth thickness T4 of the fourth layer 107 is about 4:3. In some embodiments, a ratio of the first thickness T1 of the first layer 113 to the third thickness T3 of the third layer 109 is about 1:2.

The adhesive layer 105 is disposed adjacent to the fourth layer 107 and opposite to the third layer 109. Specifically, the adhesive layer 105 is disposed directly adjacent to the fourth layer 107, such that at least a portion of a major surface of the adhesive layer 105 contacts an adjacent major surface of the fourth layer 107. The adhesive layer 105 includes an adhesive for attaching the multilayer stack 104 to the glass surface 102 of the window 103. In some embodiments, the adhesive includes an optically clear adhesive. In some embodiments, the optically clear adhesive may include a liquid adhesive. In some embodiments, the adhesive may be a non-reactive adhesive. In some embodiments, the adhesive includes an optically clear pressure sensitive adhesive. In some embodiments, the adhesive may include absorbers and stabilizers. In some embodiments, the absorbers and stabilizers may include ultraviolet (UV) absorbers, hindered amine light stabilizers (HALS), and UV stabilizers.

In some embodiments, the adhesive layer 105 may have a thickness T. In some embodiments, the thickness T of the adhesive layer 105 is from about 5 microns to 25 microns. In some embodiments, the thickness T of the adhesive layer 105 is about 7 microns. In some other embodiments, the thickness T of the adhesive layer 105 may be less than or equal to about 5 microns, less than or equal to about 6 microns, less than or equal to about 7 microns, less than or equal to about 8 microns, less than or equal to about 9 microns, less than or equal to about 10 microns, less than or equal to about 12 microns, less than or equal to 15 microns, less than or equal to 20 microns, or less than or equal to 25 microns. In some embodiments, the thickness T of the adhesive layer 105 may be greater than or equal to about 3 microns, greater than or equal to about 4 microns, greater than or equal to about 5 microns, greater than or equal to about 6 microns, greater than or equal to about 7 microns, greater than or equal to 9 microns, greater than or equal to 12 microns, greater than or equal to 15 microns, or greater than equal or equal to 20 microns. The thickness T of the adhesive layer 105 may be based on desired application attributes.

In some cases, the article 101 may be applied to the glass surface 102 using a water-based solution. In conventional films with barrier coatings, residual water from the water-based solution may cause a visibly hazy appearance which require a long duration to clear. Further, metal layers in conventional films without barrier coatings may be susceptible to corrosion.

The third layer 109 and the fourth layer 107 of the article 101 including the first and second metal oxides may protect the second layer 111 from both corrosion and more gradual oxidation. Oxidation occurs from the conversion of aluminum to aluminum oxide in the presence of air. Oxidation may lead to a gradual fading of a metal into a less reflective, more transmissive metal oxide and thereby affects shelf life of a metal film. Specifically, the third layer 109 and the fourth layer 107 may protect the second layer 111 including aluminum from oxidation. Therefore, the article 101 may be protected against oxidation and may have an improved shelf life.

Furthermore, the third layer 109 and the fourth layer 107, disposed on a same side of the second layer 111 including aluminum, may allow water transmission from the multilayer stack 104 while providing protection against both corrosion and oxidation. Therefore, the third layer 109 and the fourth layer 107 disposed on the same side of the second layer 111 may provide permeability to moisture and may allow any residual water from the water-based solution to dry out in a reasonable amount of time.

In some embodiments, the multilayer stack 104 has the WVTR of at least about 1.0 gram per square meter per day at 50° C. In some other embodiments, the multilayer stack 104 may have the WVTR from about 1.0 gram per square meter per day at 50° C. to about 20 gram per square meter per day at 50° C. In some other embodiments, the multilayer stack 104 may have the WVTR greater than or equal to about 1.0 gram per square meter per day at 50° C., greater than or equal to about 5.0 gram per square meter per day at 50° C., greater than or equal to about 10.0 gram per square meter per day at 50° C., greater than or equal to about 15.0 gram per square meter per day at 50° C., greater than or equal to about 20.0 gram per square meter per day at 50° C., or greater than or equal to about 25.0 gram per square meter per day at 50° C. The higher WVTR may provide an increased drying rate and may allow any residual water to dry out in a lesser amount of time.

Furthermore, when conventional films are removed from the window for repair or replacement purposes, the expectation is that the adhesive is cleanly removed. However, many barrier materials demonstrate poor bond to the adhesive, which may result in the adhesive being left behind when a window film including barrier materials is removed. Therefore, a sufficient bond between the adhesive layer 105 and the fourth layer 107 may be required.

The third layer 109 and the fourth layer 107 including the first and second metal oxides, respectively, may further provide a strong adhesion to the adhesive layer 105 disposed on the fourth layer 107. The strong adhesion between the adhesive layer 105 and the fourth layer 107 may cause the adhesive layer 105 to bond more strongly to the fourth layer 107 than to the glass surface 102 of the window 103. Specifically, the strong adhesion between the adhesive layer 105 and the fourth layer 107 may cause the adhesive layer 105 to bond more strongly to the multilayer stack 104 than to the glass surface 102 of the window 103. This may ensure that the adhesive layer 105 is not left behind when the article 101 is removed from the glass surface 102 for repair or replacement purposes. In other words, the strong adhesion between the adhesive layer 105 and the fourth layer 107 may allow clean removal of the article 101 from the glass surface 102.

In some embodiments, a peel strength between the adhesive layer 105 and the fourth layer 107 is greater than or equal to about 300 newtons per meter. In some embodiments, the peel strength between the adhesive layer 105 and the fourth layer 107 is greater than or equal to about 200 newtons per meter, greater than or equal to about 250 newtons per meter, greater than or equal to about 300 newtons per meter, greater than or equal to about 350 newtons per meter, greater than or equal to about 400 newtons per meter, greater than or equal to about 450 newtons per meter, or greater than or equal to about 500 newtons per meter.

Figure 3A:
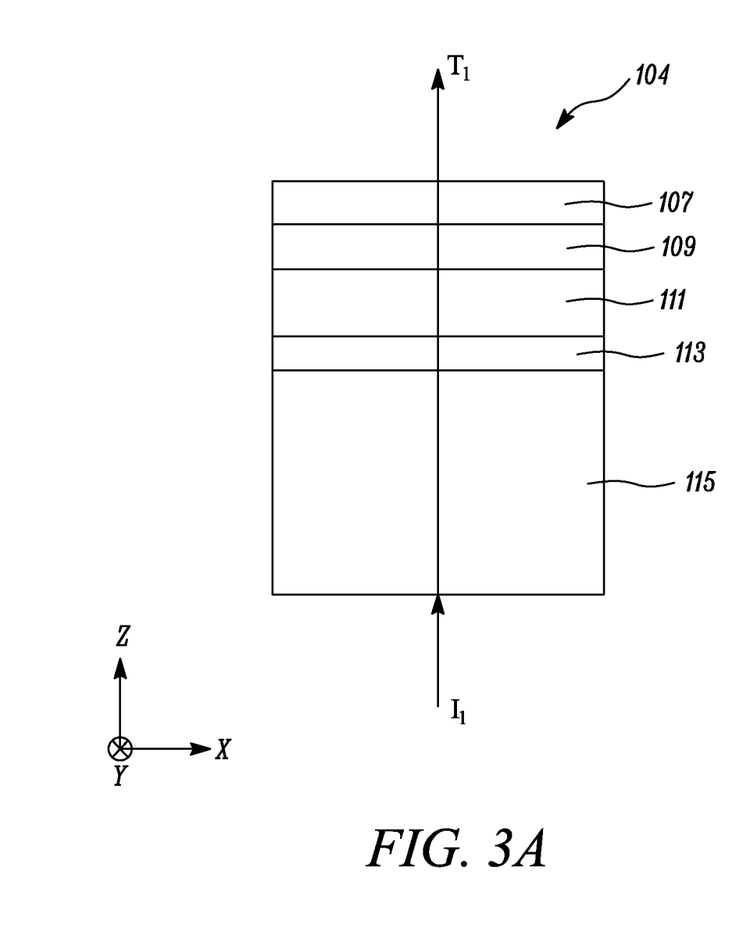
FIGS. 3A and 3B illustrate schematic cross-sectional views of the article, according to an embodiment of the present disclosure.
Figure 3B:
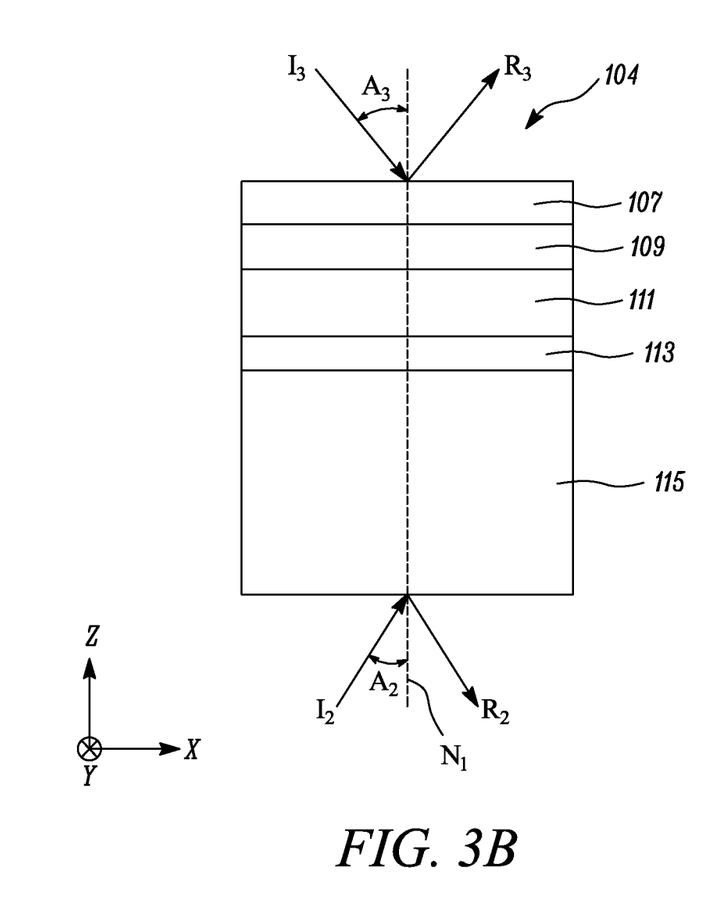

FIGS. 3A and 3B illustrate schematic cross-sectional views of the multilayer stack 104.

FIG. 3A illustrates a light $I_1$ incident on the multilayer stack 104. Specifically, the light $I_1$ is incident on the substrate layer 115 of the multilayer stack 104. However, the light $I_1$ may be incident on the fourth layer 107 of the multilayer stack 104. Further, some portion of the light $I_1$ passes through the multilayer stack 104 as a transmitted light $T_1$. In other words, light exiting the multilayer stack 104 is shown as the transmitted light $T_1$, i.e., light exiting the multilayer stack 104 corresponding to the light $I_1$. In the illustrated embodiment of FIG. 3A, the light $I_1$ is shown as a substantially normally incident light. However, the light $I_1$ may be incident at any oblique angle. Some portion of the light $I_1$ may be reflected by the multilayer stack 104. Further, some portion of the light $I_1$ may be absorbed by the multilayer stack 104.

For the light $I_1$, the multilayer stack 104 has a VLT of at least 5%. In some embodiments, the multilayer stack 104 has the VLT from about 5% to about 60%. In some embodiments, the multilayer stack 104 has the VLT from about 10% to about 60%. In some embodiments, the multilayer stack 104 has the VLT greater than or equal to about 20%, greater than or equal to about 30%, greater than or equal to about 40%, greater than or equal to about 50%, or greater than or equal to about 60%.

FIG. 3B illustrates a light $I_2$ incident on the multilayer stack 104. Specifically, the light $I_2$ is incident on the substrate layer 115 of the multilayer stack 104. FIG. 3B further illustrates another light $I_3$ incident on the multilayer stack 104. Specifically, the light $I_3$ is incident on the fourth layer 107 of the multilayer stack 104. The light $I_2$ has an incident angle $A_2$ relative to a normal $N_1$ and the light $I_3$ has an incident angle $A_3$ relative to the normal $N_1$. The normal $N_1$ to the multilayer stack 104 extends substantially along the Z-axis. However, the lights $I_2$, $I_3$ may be incident at any oblique angle.

The multilayer stack 104 reflects the light $I_2$ as a reflected light $R_2$. The multilayer stack 104 reflects the light $I_3$ as a reflected light $R_3$.

For light incident at each of the fourth layer 107 and the substrate layer 115, the multilayer stack has 104 a VLR from about 10% to about 40%. Specifically, for each of the light $I_2$ and the light $I_3$, the multilayer stack has 104 the VLR from about 10% to about 40%. In some embodiments, the multilayer stack 104 has the VLR greater than or equal to about 10%, greater than or equal to about 20%, greater than or equal to about 30%, or greater than or equal to about 40%.

Some portions of the lights $I_2$, $I_3$ may pass through the multilayer stack 104. Further, some portion of the lights $I_2$, $I_3$ may be absorbed by the multilayer stack 104.

Therefore, the article 101 may provide a good optical performance, for example, with respect to the VLT and the VLR, while having a good corrosion and oxidation resistance, water vapor transmission rate and a strong interlayer adhesion which may be required for a satisfactory installation and removal of the article 101 on the window 103.

Figure 4:
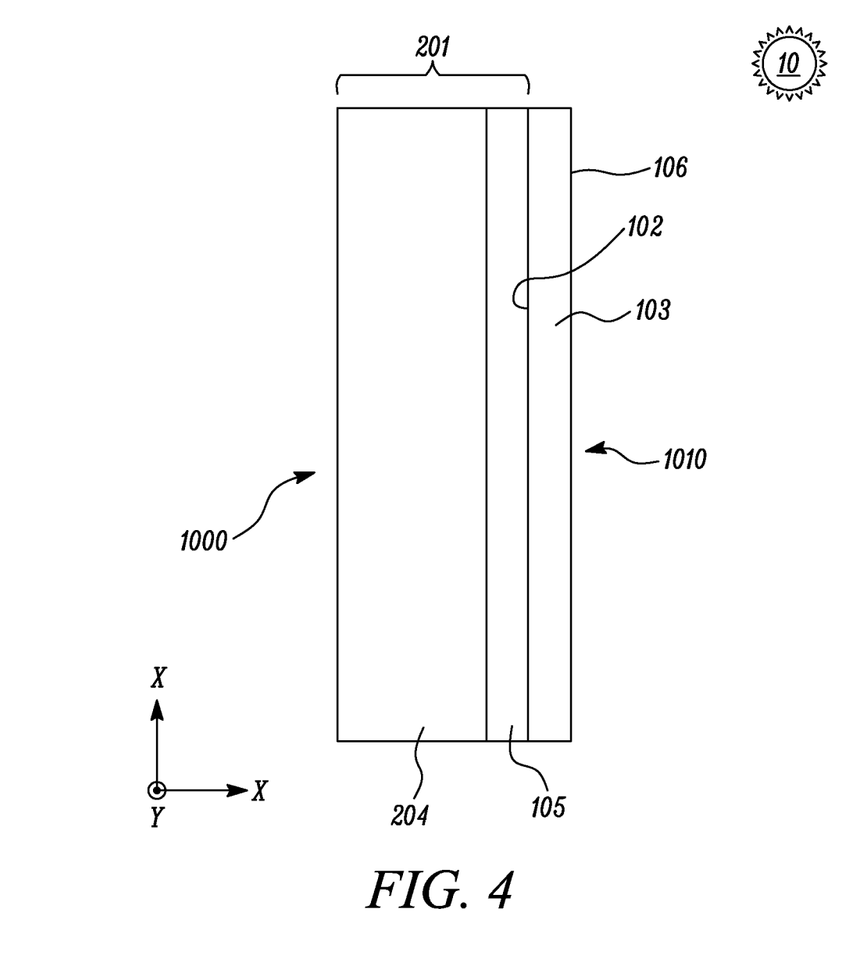
FIG. 4 illustrates a schematic cross-sectional view of another article, according to an embodiment of the present disclosure.

FIG. 4 illustrates a schematic cross-sectional view of an article 201, according to another embodiment of the present disclosure. The article 201 is substantially similar to the article 101. However, the article 201 includes a multilayer stack 204. The article 201 further includes the adhesive layer 105. The multilayer stack 204 and the adhesive layer 105 of the article 201 are disposed adjacent to each other along the Z-axis.

Figure 5:
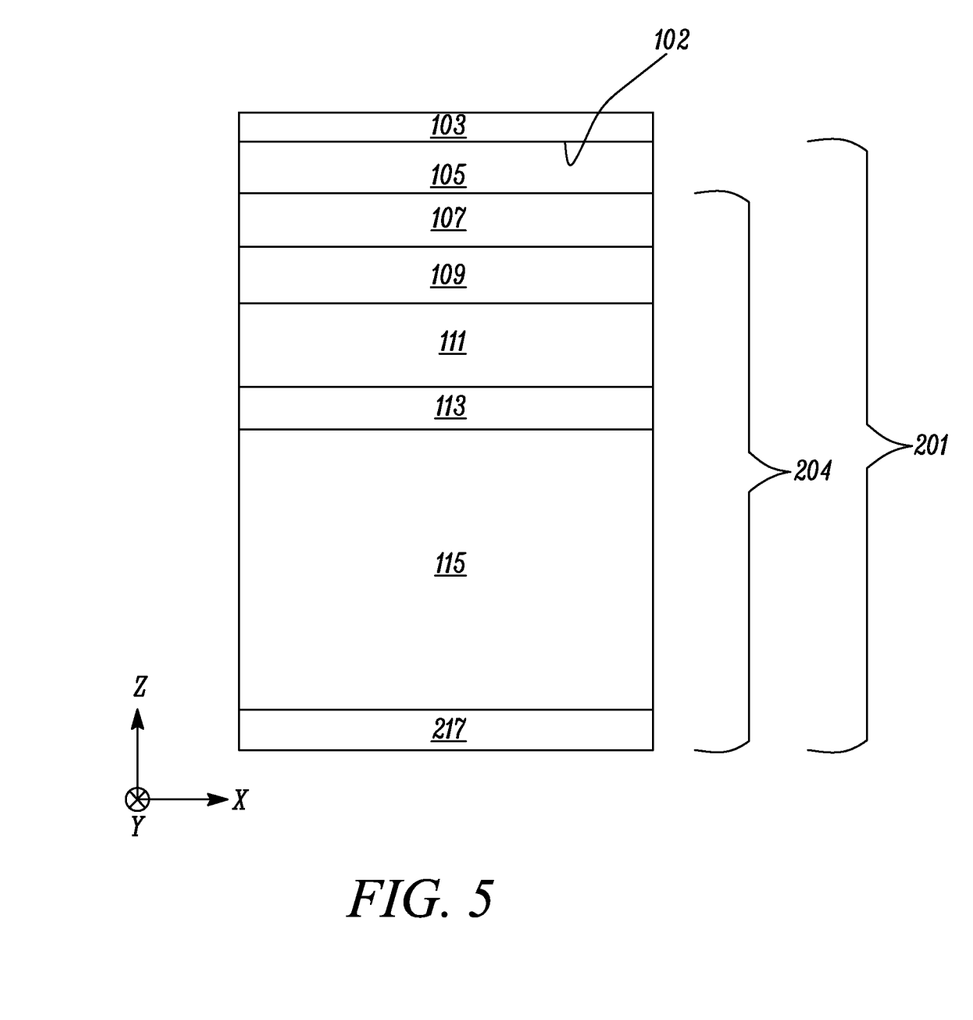
FIG. 5 illustrates a detailed schematic cross-sectional view of the article of FIG. 4, according to an embodiment of the present disclosure.

FIG. 5 illustrates a detailed schematic cross-sectional view of the article 201 for use with the glass surface 102 of the window 103. The multilayer stack 204 is substantially similar to the multilayer stack 104 of the article 101 (shown in FIG. 2). However, the multilayer stack 204 further includes a protective layer 217 disposed adjacent to the substrate layer 115 opposite to the first layer 113. Specifically, the protective layer 217 is disposed directly adjacent to the substrate layer 115, such that at least a portion of a major surface of the protective layer 217 contacts an adjacent major surface of the substrate layer 115. The protective layer 217 may mask reflectivity from the interior side 1000 (shown in FIG. 4) of the building. The article 201 may act like a one-way privacy film. In some embodiments, the protective layer 217 may also provide heat reflectivity. The protective layer 217 may help to reduce the VLT from the exterior side 1010 and the VLR from the interior side 1000. In some embodiments, the protective layer 217 may block UV radiation significantly. In some embodiments, the protective layer 217 is UV curable.

In some embodiments, the protective layer 217 includes a light absorbing material. In some embodiments, the light absorbing material includes carbon black. In some embodiments, the protective layer 217 includes a slip agent. In some embodiments, the slip agent may include a cross-linkable slip agent. In some embodiments, the protective layer 217 includes acrylate monomers. In some embodiments, the protective layer 217 includes acrylate monomers blended with photoinitiators sensitive to UV light. In some embodiments, the photoinitiators may include UV photoinitiators.

In some embodiments the multilayer stack 204 has a WVTR of at least about 1.0 gram per square meter per day at 50° C. In some other embodiments, the multilayer stack 204 may have the WVTR from about 1.0 gram per square meter per day at 50° C. to about 20 gram per square meter per day at 50° C. In some other embodiments, the multilayer stack 204 may have the WVTR greater than or equal to about 1.0 gram per square meter per day at 50° C., greater than or equal to about 5.0 gram per square meter per day at 50° C., greater than or equal to about 10.0 gram per square meter per day at 50° C., greater than or equal to about 15.0 gram per square meter per day at 50° C., greater than or equal to about 20.0 gram per square meter per day at 50° C., or greater than or equal to about 25.0 gram per square meter per day at 50° C.

Figure 6:
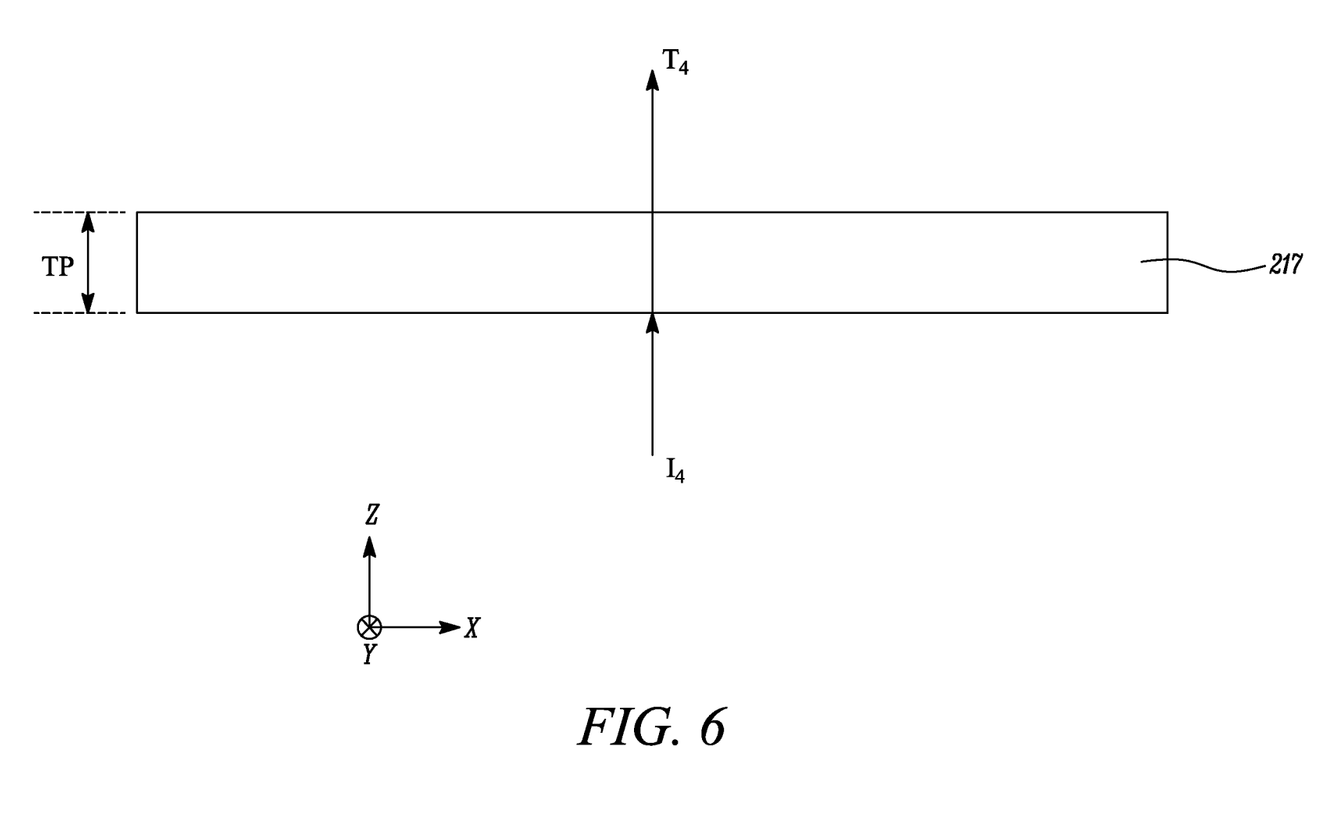
FIG. 6 illustrates a schematic cross-sectional view of a protective layer of the article of FIG. 4, according to an embodiment of the present disclosure.

FIG. 6 illustrates the protective layer 217 of the article 201. In some embodiments, the protective layer 217 may have a thickness TP. In some embodiments, the thickness TP of the protective layer 217 is from about 1 micron to 5 microns. In some embodiments, the thickness TP of the protective layer 217 is about 2.5 microns. In some other embodiments, the thickness TP of the protective layer 217 may be less than or equal to about 2 microns, less than or equal to about 3 microns, less than or equal to about 4 microns, less than or equal to about 5 microns, less than or equal to about 6 microns, less than or equal to about 7 microns, or less than or equal to about 8 microns. In some embodiments, the thickness TP of the protective layer 217 is greater than or equal to about 1 micron, greater than or equal to about 1.5 microns, greater than or equal to about 2 microns, or greater than or equal to about 2.5 microns. The thickness TP of the protective layer 217 may be based on desired application attributes.

FIG. 6 further illustrates a light $I_4$ incident on the protective layer 217. Some portion of the light $I_4$ passes through the protective layer 217 as a transmitted light $T_4$. In other words, light exiting the protective layer 217 is shown as the transmitted light $T_4$, i.e., light exiting the protective layer 217 corresponding to the light $I_4$. In the illustrated embodiment of FIG. 3A, the light $I_4$ is shown as substantially normally incident light. However, the light $I_4$ may be incident at any oblique angle. Some portion of the light $I_4$ may be reflected by the protective layer 217. Further, some portion of the light $I_4$ may be absorbed by the protective layer 217.

For the light $I_4$, the protective layer 217 has a VLT from about 30% to about 70%. In some embodiments, the protective layer 217 has the VLT greater than or equal to about 30%, greater than or equal to about 40%, greater than or equal to about 50%, greater than or equal to about 60%, or greater than or equal to about 70%.

Figure 7A:
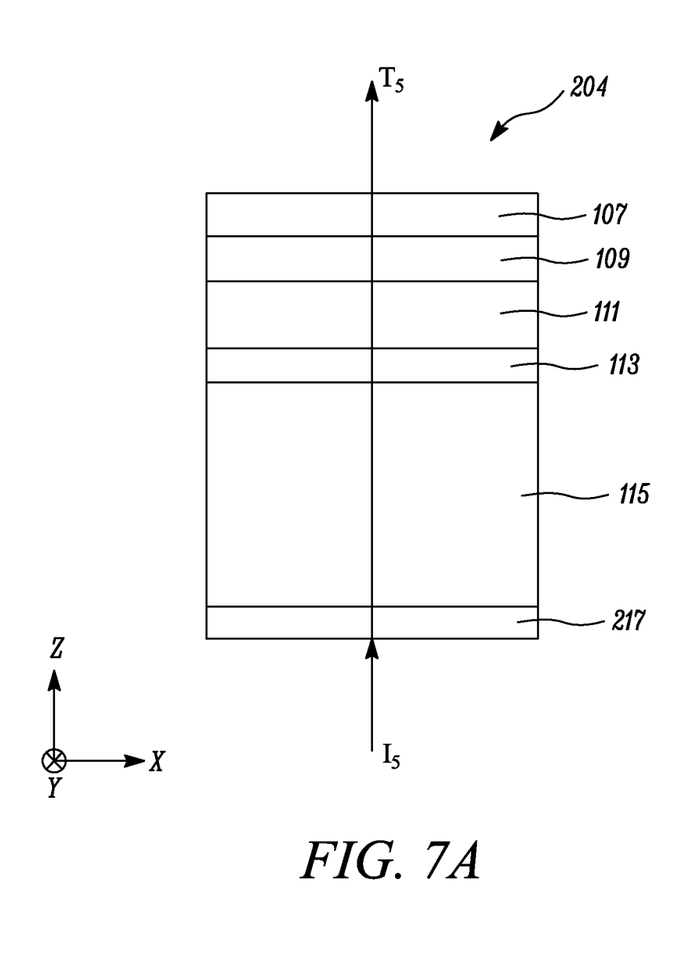
FIGS. 7A and 7B illustrate schematic cross-sectional views of the article of FIG. 4, according to an embodiment of the present disclosure.
Figure 7B:
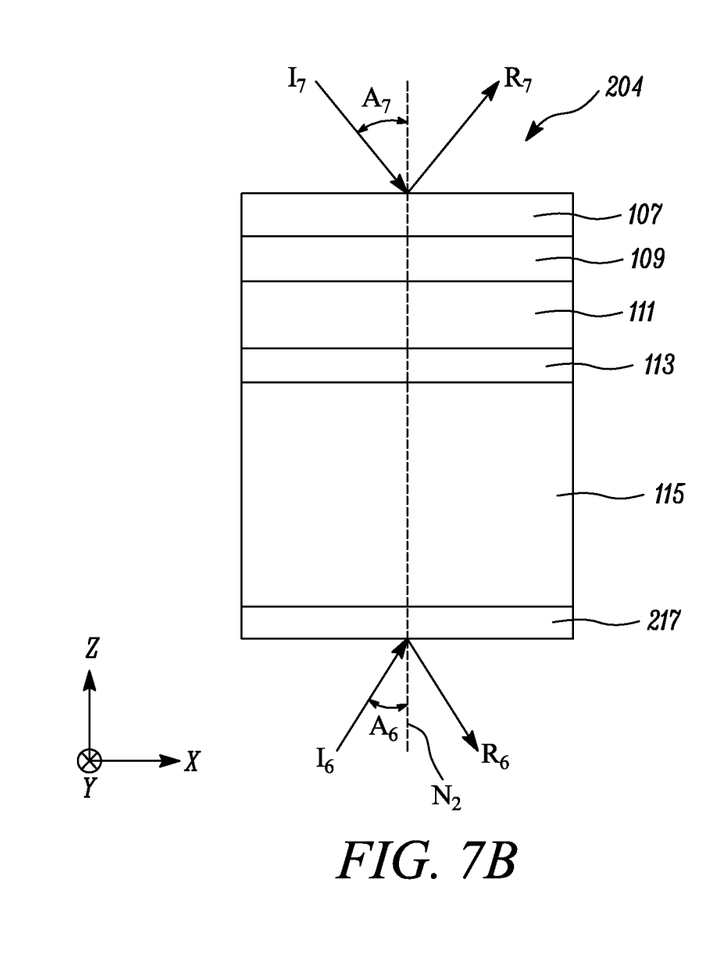

FIGS. 7A and 7B illustrate schematic cross-sectional views of the multilayer stack 204.

FIG. 7A illustrates a light $I_5$ incident on the multilayer stack 204. Specifically, the light $I_5$ is incident on the protective layer 217 of the multilayer stack 204. However, the light $I_5$ may be incident on the fourth layer 107 of the multilayer stack 204. Further, some portion of the light $I_5$ passes through the multilayer stack 204 as a transmitted light $T_5$. In other words, light exiting the multilayer stack 204 is shown as the transmitted light $T_5$, i.e., light exiting the multilayer stack 204 corresponding to the light $I_5$. In the illustrated embodiment of FIG. 7A, the light $I_5$ is shown as a substantially normally incident light. However, the light $I_5$ may be incident at any oblique angle. Some portion of the light $I_5$ may be reflected by the multilayer stack 204. Further, some portion of the light $I_5$ may be absorbed by the multilayer stack 204.

For the light $I_5$, the multilayer stack 204 has a VLT from about 5% to about 35%. In some embodiments, the multilayer stack 204 has the VLT greater than or equal to about 5%, greater than or equal to about 10%, greater than or equal to about 20%, greater than or equal to about 30%, or greater than or equal to about 35%.

FIG. 7B illustrates a light $I_6$ incident on the multilayer stack 204. Specifically, the light $I_6$ is incident on the protective layer 217 of the multilayer stack 204. FIG. 7B further illustrates another light $I_7$ incident on the multilayer stack 204. Specifically, the light $I_7$ is incident on the fourth layer 107 of the multilayer stack 204. The light $I_6$ has an incident angle A6 relative to a normal $N_2$ and the light $I_7$ has an incident angle A7 relative to the normal $N_2$. The normal $N_2$ to the multilayer stack 204 extends substantially along the Z-axis. However, the lights $I_6$, $I_7$ may be incident at any oblique angle.

The multilayer stack 204 reflects the light $I_6$ as a reflected light $R_6$. The multilayer stack 204 reflects the light $I_7$ as a reflected light $R_7$.

For the light $I_6$ incident at the protective layer 217, the multilayer stack 204 has a VLR from about 6% to about 10%. In some embodiments, for the light $I_6$ incident at the protective layer 217, the multilayer stack 204 has the VLR greater than or equal to about 5%, greater than or equal to about 6%, greater than or equal to about 8%, or greater than or equal to about 10%.

For the light $I_7$ incident at the fourth layer 107, the multilayer stack 204 has a VLR from about 10% to about 40%. In some embodiments, for the light $I_7$ incident at the fourth layer 107, the multilayer stack has 204 the VLR greater than or equal to about 10%, greater than or equal to about 20%, greater than or equal to about 30%, or greater than or equal to about 40%.

Some portion of the lights $I_6$, $I_7$ may pass through the multilayer stack 204. Further, some portion of the lights $I_6$, $I_7$ may be absorbed by the multilayer stack 204.

Examples

The following methods and examples are offered for illustrative purposes only and is not intended to limit the scope of the disclosure in any way. Indeed, various modifications of the disclosure in addition to those shown and described herein will become apparent to those skilled in the art from the foregoing description and the following examples and fall within the scope of the appended claims.

Table 1 provided below lists some exemplary materials that are used for the preparation of a pressure sensitive adhesive (PSA) and a hardcoat. The adhesive layer 105 described above may include the PSA. The protective layer 217 described above may include the hardcoat.

TABLE 1

Material List

| Abbreviation | Description |
|---|---|
| M | 50:50 blend of hexanediol diacrylate and pentaerythritol triacrylate monomers (SR238, SR295, commercially available from Sartomer Company, Exton, PA) |
| S | TEGORAD 2250 slip agent (commercially available from Evonik Operations GmbH, Essen, Germany) |

TABLE 1-continued

Material List

| Abbreviation | Description |
|---|---|
| PH | IRGACURE 819 photoinitiator (commercially available from BASF Corporation, Florham Park, NJ) |
| P | Pigment dispersion - Carbon Black RS N/C Paste (commercially available from Penn Color Inc., Doylestown, PA) |
| RS1 | Acrylic pressure sensitive adhesive comprised of 94 parts isooctyl acrylate and 6 parts acrylamide, such as described in patent U.S. Pat. No. 4,751,087, the disclosure of which is incorporated herein in its entirety by reference. |
| RS2 | Acrylic resin - AROSET 1860 Z45 (commercially available from Valvoline Company, Lexington, KY) |
| AS1 | UVINUL 3050 (commercially available from BASF Corporation, Florham Park, NJ) |
| AS2 | TINUVIN 123 (commercially available from BASF Corporation, Florham Park, NJ) |
| AS3 | TINUVIN 477 (commercially available from BASF Corporation, Florham Park, NJ) |

Solvents and other common reagents used are of common laboratory grades and were obtained from Sigma-Aldrich Chemical Company (Milwaukee, Wisconsin).

Hardcoat Preparation

The hardcoat included acrylate monomers blended with photoinitiators sensitive to UV light and carbon black nanopigment. The monomer, M, was diluted to 40% solids in a 60:40 blend of Methyl Ethyl Ketone (MEK) and 1-methoxy-2-propanol with pigment dispersion P added at 33% of monomer weight, photoinitiator PH added at 1% of monomer weight, and slip agent S added at 0.04% of monomer weight.

PSA Preparation

The PSA used was a blend of 84 parts of a soft acrylate polymer RS1 to 16 parts of a stiffer acrylic resin RS2. These resins were diluted to 20% total solids in a blend of solvents (8% isopropyl alcohol/34% ethyl acetate/20% toluene/3% MEK/35% heptane) designed to keep the resins in a homogeneous solution at a viscosity to allow coatability. In addition, absorbers and stabilizers were added: AS1 at 0.4% by weight, AS2 at 0.2% by weight, and AS3 at 1.8% by weight.

In a first prototype experiment, Samples 1-1 to 1-10 window films were prepared. Samples 1-1 to 1-10 window films had an aluminum layer. A silicon oxide ($SiO_x$) layer was disposed on the aluminum layer. The aluminum layer and the $SiO_x$ layer were disposed on a 2-mil PET substrate. Resistance to oxidation when applied to a glass was measured by reflectivity loss after exposure to 500 hours of 65° C./95% relative humidity (RH) conditions. In this test, a smaller % change indicates better resistance to oxidation. Further, peel force was measured after application to the glass and conditioning for 24 hours in a constant temperature and humidity (CTH) room. The goal of the first prototype experiment was to optimize interlayer adhesion. Variables studied in the vacuum deposition were:

1. whether a top layer was an acrylate layer or ZTO
2. whether a bottom layer was an acrylate layer or NiCr Table 2 shown below provides experimental results of the first prototype experiment.

TABLE 2

Results of the first prototype experiment

| Sample | Base Layer | Top Layer | Adhesion to glass surface Average Peel Strength (newtons per meter) | Clean Removal of Layer | Oxidation rate in 65/95 RH conditions Initial Reflectivity (% VLRi) | % Change in Reflectivity (Rc) |
|---|---|---|---|---|---|---|
| Sample 1-1 | Acrylate | ZTO | 102 | No | 35.0 | −15.1 |
| Sample 1-2 | NiCr | ZTO | 479 | Yes | 30.8 | −12.6 |
| Sample 1-3 | None | None | 108 | No | 35.1 | −13.5 |
| Sample 1-4 | NiCr | Acrylate | 180 | No | 44.8 | −8.9 |
| Sample 1-5 | Acrylate | Acrylate | 119 | Yes, but difficult | 44.7 | −11.3 |
| Sample 1-6 | Acrylate | ZTO | 85 | No | 17.7 | −31.7 |
| Sample 1-7 | NiCr | ZTO | 471 | Yes | 15.5 | −27.3 |
| Sample 1-8 | None | None | 69 | No | 18.2 | −27.9 |
| Sample 1-9 | NiCr | Acrylate | 211 | Yes, but difficult | 24.3 | −17.0 |
| Sample 1-10 | Acrylate | Acrylate | 125 | Yes | 25.2 | −19.2 |

The results of the first prototype experiment test indicated that the addition of a NiCr layer below the aluminum layer and addition of the ZTO layer on the SiOx layer provided the best interlayer adhesion. Specifically, the NiCr layer below the aluminum layer and the ZTO layer on the $SiO_x$ layer allowed clean removal of the PSA from the glass. Further, oxidation resistances of Samples 1-1 to 1-10 window films were comparable and depended on the metal layer thickness (as shown by reflectivity) rather than the presence of acrylate layers.

In a second prototype experiment, Samples 2-1 to 2-6 window films were prepared. The goal of the second prototype experiment was to validate whether optical properties of Sample 2-1 to 2-6 window films would match 3M Sun Control Window Film Night Vision series films. VLT in Table 3 stands for visual light transmission.

Table 3 shown below provides experimental results of the second prototype experiment.

TABLE 3

Results of the second prototype experiment

| Sample | ZTO | % VLT | Glass Adhesion Average Peel Strength (newtons per meter) | Oxidation rate in 65/95 RH conditions | |
|---|---|---|---|---|---|
| | | | | Initial Reflectivity (% VLRi) | % Change in Reflectivity (Rc) |
| Sample 2-1 | Yes | 15.7% | 431 | 28.6 | −9.0 |
| Sample 2-2 | No | 14.7% | 185 | 31.8 | −16.4 |
| 3M Sun Control Window Film Night Vision 15 | N/A | 16.2% | 267 | 29.6 | −15.6 |
| Sample 2-3 | Yes | 22.6% | 429 | 16.1 | −23.2 |
| Sample 2-4 | No | 23.0% | 193 | 16.5 | −28.5 |
| 3M Sun Control Window Film Night Vision 25 | N/A | 26.0% | 174 | 16.1 | −18.9 |
| Sample 2-5 | Yes | 35.9% | 442 | 13.8 | −27.5 |
| Sample 2-6 | No | 35.6% | 200 | 14.2 | −34.7 |
| 3M Sun Control Window Film Night Vision 35 | N/A | 34.4% | 173 | 10.6 | −27.8 |

The results of the second prototype experiment test indicated that oxidation resistance and weathering of Samples 2-1 to 2-6 window films were comparable with that of 3M Sun Control Window Film Night Vision series films. The results of the second prototype experiment test further indicated that the average peel strength improved with the ZTO layer deposited over the SiOx layer. Superior weathering performance and oxidation resistance are indicated by smaller changes in transmission and reflectivity.

In addition to oxidation resistance and peel strength, a Water Vapor Transmission Rate (WVTR) test was performed. Specifically, WVTR of Conventional NV Films 3-1 to 3-3 and Conventional Thinsulate Climate Control Film was compared with that of Sample 3-1 to Sample 3-3 window films, which were prepared according to an embodiment of the present disclosure.

Table 4 shown below provides experimental results of WVTR test.

TABLE 4

Results of Water Vapor Transmission Rate test

| Sample | Configuration of Multilayer stack | Water Vapor Transmission Rate (gm/m²/day) at 50° C. |
|---|---|---|
| Conventional NV Film 3-1 | Amorphous polyester | 16 |
| Conventional NV Film 3-2 | Amorphous polyester | 23 |
| Conventional NV Film 3-3 | Amorphous polyester | 25 |
| Sample 3-1 | Single Side Oxide Layer | 1.2 |
| Sample 3-2 | Single Side Oxide Layer | 1.7 |
| Sample 3-3 | Single Side Oxide Layer | 2.2 |
| Conventional Thinsulate Climate Control Film | Dual Side Oxide Layer with acrylate underneath | 0.02 |

The SiOx layer and the ZTO layer of the window films (equivalent to the article 101 or the article 201 of the present disclosure) may protect the second layer from corrosion and oxidation. Specifically, the SiOx layer and the ZTO layer may protect the aluminum layer from corrosion and oxidation. Therefore, the window films may be protected against corrosion and oxidation and may have an improved shelf life and installed life.

Further, the SiOx layer and the ZTO layer disposed on a same side of the aluminum layer may allow water transmission from the window films while providing protection against corrosion and oxidation. Therefore, the SiOx layer and the ZTO layer disposed on the same side of the aluminum layer may provide permeability to moisture and may allow any residual water to dry out in a reasonable amount of time. The higher WVTR may provide an increased drying rate and may allow any residual water to dry out in a lesser amount of time.

The SiOx layer and the ZTO layer may further provide a strong adhesion to the PSA disposed on the ZTO layer. The strong adhesion between the PSA and the ZTO layer may cause the PSA to bond more strongly to the ZTO layer than to the glass. This may ensure that the PSA is not left behind when the window film is removed from the glass for repair or replacement purposes. In other words, the strong adhesion between the PSA and the ZTO layer may allow clean removal of the window film from the glass.

Therefore, the window films according to the present disclosure may provide a good optical performance, a good corrosion and oxidation resistance, a good water vapor transmission rate and a strong interlayer adhesion required for a satisfactory installation and removal of the window film.

The above experimental details so obtained depict that the present disclosure with single side oxide layers of ZTO and silicon oxide has acceptable water vapor transmission rate to let the water vapor in the glass surface dry out rapidly and at an acceptable rate as compared to one with amorphous polyester in the multilayer stack or one with dual side oxide layer and an acrylate base layer. While a low value of water vapor transmission rate is ostensibly better for oxidation resistance of the aluminum layer, it would increase the necessary drying time of a window film on glass, since they are applied using a water-based slip solution and hence is not acceptable.

The experimental results shown in Tables 2 to 4 provided above thereby provide a multilayer stack including a substrate layer, a first layer including nichrome, a second layer including aluminum, a third layer including silicon oxide, a fourth layer including ZTO as shown in FIG. 2 and optionally with a protective layer as shown in FIG. 5. The arrangement of layers as shown in FIGS. 2 and 5 may provide the right combination of optical performance, interlayer adhesion, water vapor transmission rate, and corrosion and oxidation protection for the multilayer stack.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An article for use with a glass surface, the article comprising:
    a multilayer stack comprising:
        a substrate layer;
        a first layer disposed adjacent to the substrate layer, the first layer comprising nichrome;
        a second layer disposed adjacent to the first layer opposite to the substrate layer, the second layer comprising aluminum;
        a third layer disposed adjacent to the second layer opposite to the first layer, the third layer comprising a first metal oxide; and
        a fourth layer disposed adjacent to the third layer opposite to the second layer, the fourth layer comprising a second metal oxide different from the first metal oxide; and
    an adhesive layer disposed adjacent to the fourth layer opposite to the third layer, wherein the adhesive layer comprises an adhesive for attaching the multilayer stack to the glass surface.

2. The article of claim 1, wherein the first metal oxide comprises silicon oxide.

3. The article of claim 1, wherein the second metal oxide comprises zinc tin oxide.

4. The article of claim 1, wherein the substrate layer comprises a polymeric material having a visible light transmittance of at least about 90%.

5. The article of claim 1, wherein a substrate thickness of the substrate layer is from about 20 microns to about 175 microns.

6. The article of claim 1, wherein a first thickness of the first layer is from 0.5 nanometers to about 5 nanometers.

7. The article of claim 1, wherein a second thickness of the second layer is from about 2 nanometers to about 25 nanometers.

8. The article of claim 1, wherein a third thickness of the third layer is from about 1 nanometer to about 10 nanometers.

9. The article of claim 1, wherein a fourth thickness of the fourth layer is from about 1 nanometer to about 10 nanometers.

10. The article of claim 1, wherein a peel strength between the adhesive layer and the fourth layer is greater than or equal to about 300 newtons per meter.

11. The article of claim 1, wherein the multilayer stack further comprises a protective layer disposed adjacent to the substrate layer opposite to the first layer, the protective layer comprising a light absorbing material such that the protective layer has a visible light transmittance from about 30% to about 70%.

12. The article of claim 11, wherein the multilayer stack has a visible light transmittance from about 5% to about 35%.

13. The article of claim 11, wherein, for light incident at the fourth layer, the multilayer stack has a visible light reflectivity from about 10% to about 40%.

14. The article of claim 11, wherein, for light incident at the protective layer, the multilayer stack has a visible light reflectivity from about 6% to about 10%.

15. The article of claim 1, wherein the multilayer stack has a water vapor transmission rate of at least about 1.0 gram per square meter per day at 50° C.

16. The article of claim 1, wherein the multilayer stack has a water vapor transmission rate from about 1.0 gram per square meter per day at 50° C. to about 20 gram per square meter per day at 50° C.

17. The article of claim 1, wherein the multilayer stack has a visible light transmittance of at least 5%.

18. The article of claim 1, wherein, for light incident at each of the fourth layer and the substrate layer, the multilayer stack has a visible light reflectivity from about 10% to about 40%.

19. An article for use with a glass surface, the article comprising:
    a multilayer stack comprising:
        a substrate layer;
        a first layer disposed adjacent to the substrate layer, the first layer comprising nichrome;
        a second layer disposed adjacent to the first layer opposite to the substrate layer, the second layer comprising aluminum;
        a third layer disposed adjacent to the second layer opposite to the first layer, the third layer comprising silicon oxide;
        a fourth layer disposed adjacent to the third layer opposite to the second layer, the fourth layer comprising zinc tin oxide; and
        a protective layer disposed adjacent to the substrate layer opposite to the first layer, the protective layer comprising a light absorbing material; and
    an adhesive layer disposed adjacent to the fourth layer opposite to the third layer, wherein the adhesive layer comprises an adhesive for attaching the multilayer stack to the glass surface, such that the multilayer stack has:
        a water vapor transmission rate of at least about 1.0 gram per square meter per day at 50° C.;
        a visible light transmittance from about 5% to about 35%;
        for light incident at the fourth layer, a visible light reflectivity from about 10% to about 40%; and
        for light incident at the protective layer, a visible light reflectivity from about 6% to about 10%.

20. An article for use with a glass surface, the article comprising:
    a multilayer stack comprising:
        a substrate layer;
        a first layer disposed adjacent to the substrate layer, the first layer comprising nichrome;
        a second layer disposed adjacent to the first layer opposite to the substrate layer, the second layer comprising aluminum;
        a third layer disposed adjacent to the second layer opposite to the first layer, the third layer comprising silicon oxide; and a fourth layer disposed adjacent to the third layer opposite to the second layer, the fourth layer comprising zinc tin oxide; and an adhesive layer disposed adjacent to the fourth layer opposite to the third layer, wherein the adhesive layer comprises an adhesive for attaching the multilayer stack to the glass surface, such that the multilayer stack has:

a water vapor transmission rate of at least about 1.0 gram per square meter per day at 50° C.;

a visible light transmittance of at least 5%; and for light incident at each of the fourth layer and the substrate layer, a visible light reflectivity from about 10% to about 40%.

* * * * *